A. E. COOK.
COMBINED MOTOR PLOW AND SEEDER.
APPLICATION FILED MAY 28, 1914.
1,200,813.
Patented Oct. 10, 1916.
3 SHEETS—SHEET 1.
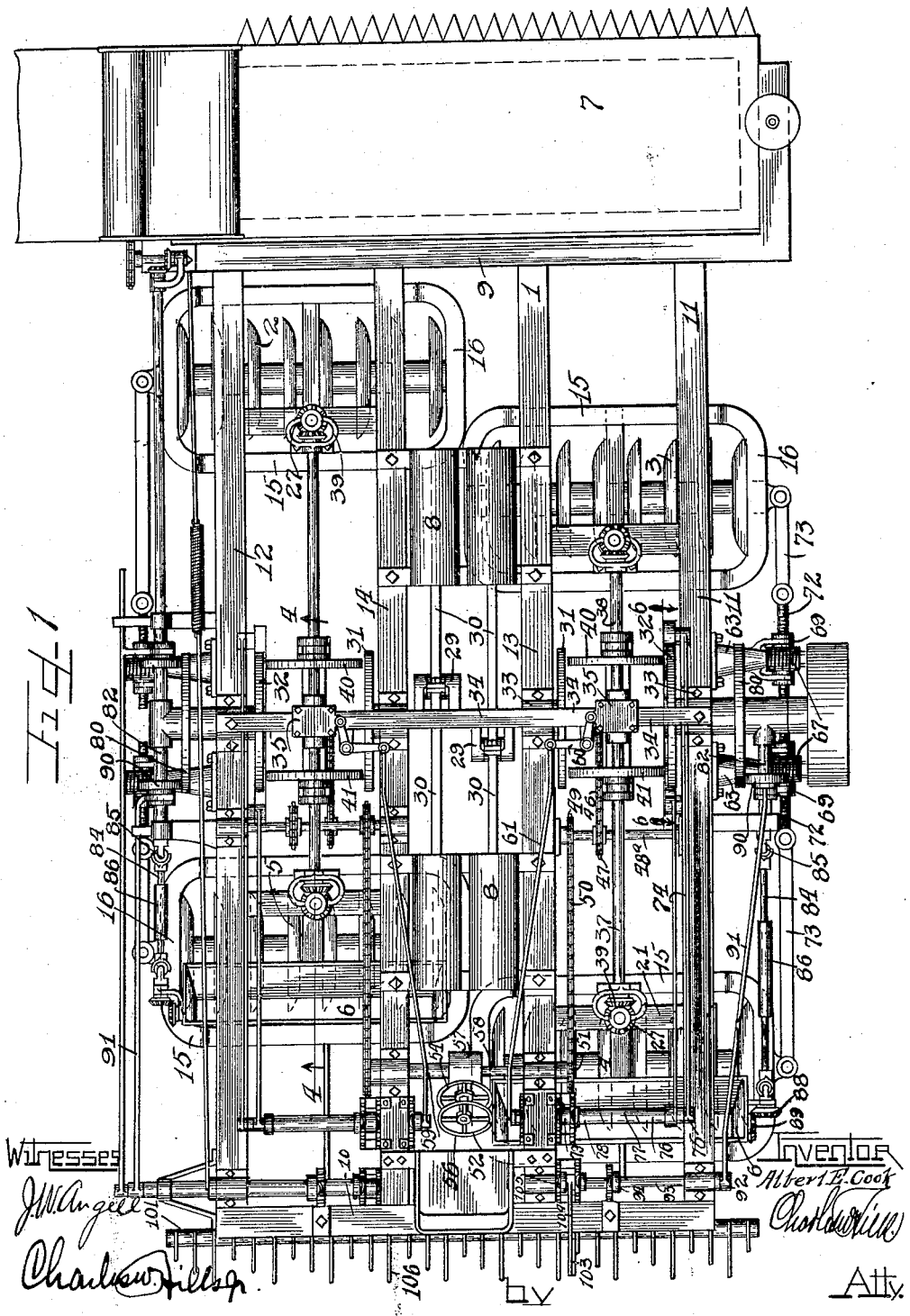

A. E. COOK.
COMBINED MOTOR PLOW AND SEEDER.
APPLICATION FILED MAY 28, 1914.
1,200,813.
Patented Oct. 10, 1916.
3 SHEETS—SHEET 2.
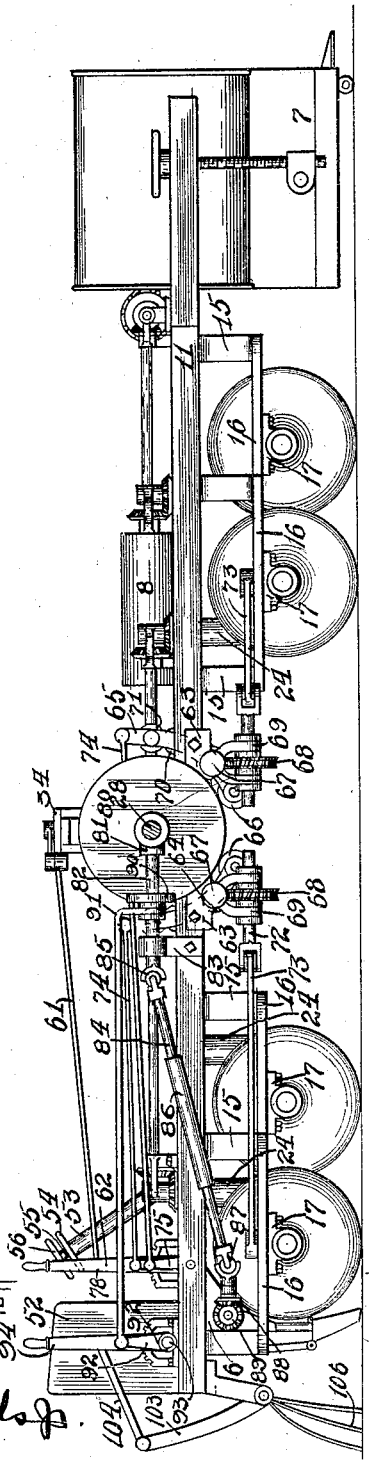
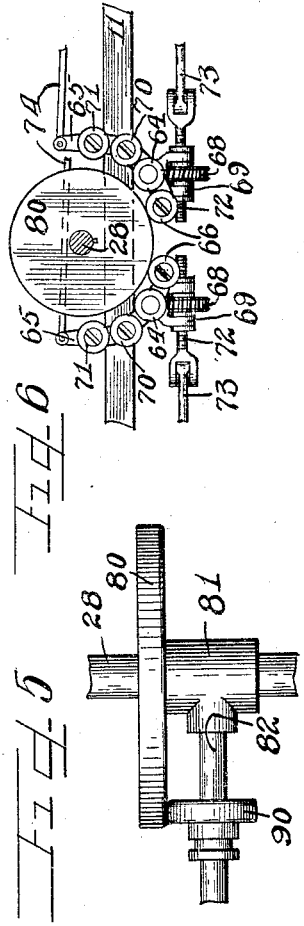

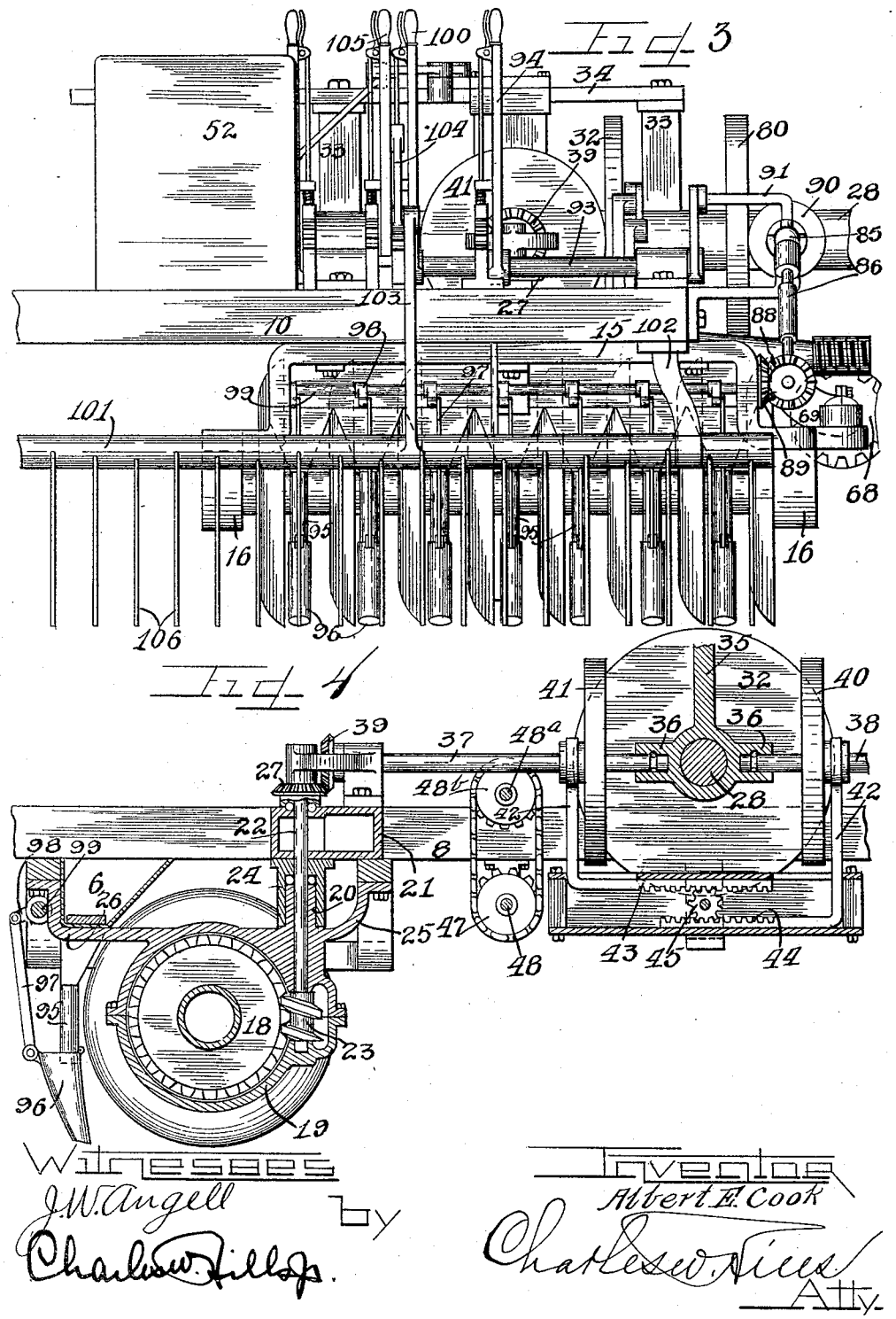

UNITED STATES PATENT OFFICE.

ALBERT E. COOK, OF KANKAKEE, ILLINOIS.

COMBINED MOTOR-PLOW AND SEEDER.

1,200,813.  Specification of Letters Patent.  Patented Oct. 10, 1916.

Original application filed October 23, 1908, Serial No. 459,139. Divided and this application filed May 28, 1914. Serial No. 841,414.

*To all whom it may concern:*

Be it known that I, ALBERT E. COOK, a citizen of the United States, and a resident of the town of Kankakee, in the county of Kankakee and State of Illinois, have invented certain new and useful Improvements in Combined Motor-Plows and Seeders; and I do hereby declare that the following is a full, clear, and exact description of the same, reference being had to the accompanying drawings, and to the numerals of reference marked thereon, which form a part of this specification.

This application constitutes a division of my co-pending application for patent for "agricultural implements", filed October 23, 1908, Serial No. 459,139.

The advent of the motor plow has been one of the natural results in the great progress of scientific farming. Where formerly considerable time was expended in plowing large tracts of land, this operation is now performed more efficiently, and in a much less time, by motor driven plows, and by this invention not only is the plowing operation proceeded with in a thoroughly efficient manner, but mechanisms are associated with the motor plow and positively driven from the power plant thereon to plant seed in the plowed ground.

This invention has for its object the construction of a machine for preparing the soil and planting a crop at one operation, and provided with propelling means, which simultaneously advance the machine and operate the planting or dropper mechanisms, distributing seed into the plowed ground, and thereafter covering the same with a layer of the plowed soil.

It is also an object of this invention to construct an automobile plow of the class described wherein the supporting wheels or disks serve both to support and propel the machine, and also open the soil to receive the seed therein.

It is also an object of this invention to afford in combination with an automobile frame supporting cultivating disks, serving the purpose of wheels and acting as plows in opening the soil and to afford in connection therewith dropping mechanism whereby the seed for a new crop may be dropped at the rear of the disks as the soil is turned.

It is also a very important object of this invention to afford a planting machine provided with mechanism for clearing the soil in advance thereof, of a previous crop, or of weeds, or of refuse, said machine, as a whole, being supported upon power driven disks which serve to turn or plow the soil and open the same in advance of the seed dropping mechanism, said machine also being provided with means for covering the seed after the same have been dropped.

Another important object of my invention is to afford supporting and driving disks which, although serving as wheels to support and propel the machine, are specially shaped to open and turn the soil in advance of the seed dropping mechanism, said disks being so formed as to turn a furrow to receive the seed therein and power driven feeding mechanisms acting to distribute the seed in the furrows so turned.

It is a further object of this invention to construct a machine with a motor for driving the same through the plowing mechanism, and with friction transmission devices acting to operate a seeding mechanism which moves with the plowing means when they are adjusted without in any way interfering with the drive thereto.

The invention embraces many other novel features hereinafter more fully described and pointed out and defined in the appended claims.

In the drawings, Figure 1 is a top plan view of a machine embodying the principles of my invention. Fig. 2 is a side elevation thereof. Fig. 3 is an enlarged rear elevation thereof, showing the same broken away. Fig. 4 is a fragmentary section taken on line 4—4 of Fig. 1. Fig. 5 is a fragmentary top plan view showing the detail of the friction driving connection for the seeder mechanism. Fig. 6 is a detail of a portion of the friction driving mechanisms.

As shown in the drawings, the machine consists of a suitable frame, indicated as a whole by the reference numeral 1, and supported on gangs of cultivating or plowing disks, as shown four in number, each indicated as a whole by the respective reference numerals 2, 3, 4, and 5. These gangs of disks serve the double purpose of supporting and propelling the machine in lieu of wheels, and also serve to plow or open the soil for the reception of the seed from the seed dropping mechanisms 6, one attached to each of the rear gangs 4 and 5, respectively. In order to clear the soil in advance of the machine or for harvesting the previous crop, it is provided with a suitable cutting mechanism, indicated as a whole by the reference numeral 7. All of the mechanisms of the machine are operated from a common motor 8, by means of suitable transmission devices and mechanisms, which enable one or more of the mechanisms described to be thrown out of action at the will of the operator.

Referring more specifically to the construction, the frame 1, is substantially rectangular in form and is constructed of flattened metal tubing, though not necessarily so, and comprises, as shown, end sills or members 9, and 10, side sills 11 and 12, and center sills 13 and 14, respectively, all of which are rigidly secured together in any convenient manner to afford extreme rigidity with comparatively light weight. For this purpose, if desired, the individual frame members may be brazed together, electrically welded, or connected in any other known or suitable manner to afford a rigid construction. Said frame is supported upon the respective gangs of disks 2, 3, 4, and 5, already described. Each gang of disks is journaled at its ends in a gang frame 15, all of which are constructed in the same manner, and each gang frame comprises horizontal side bars on which the sills of the main frame rest, and end members 16, disposed in a lower plane than the side bars and connected thereto by curved portions supported by the end members are the boxings 17, for the gang shafts, as shown in Fig. 2. Each gang of disks is pivotally connected with the main frame, the front gangs each at the rear of the center of its axis and the rear in advance of their axes, whereby said gang frames adjust the respective gangs of disks at a suitable angle for the most efficient work or in turning. As shown in detail in Fig. 4, a worm gear 18, is rigidly secured on the middle shaft section of each gang, and is of a diameter materially less than the adjacent disks. Fitting over said worm gear and inclosing the same is a close fitting casing 19, recessed and provided with a vertical aperture or bearing for a purpose hereinafter pointed out, and having an upwardly extending stem 20. Journaled vertically in a cross sill 21, adjacent each gang which connects each of the side sills with the adjacent center sills, is a vertical shaft 22, provided on its lower end with a worm 23, said shaft extending through said stem 20, and the worm engaging the worm wheel 18, in the recessed or enlarged portion of the casing 19. The upper end of said stem 20, is shaped to afford a part of a ball race, the remaining portion of which is formed by the inner end of a bearing cap 24, which fits over said stem, as clearly shown in Fig. 4, and is rigidly bolted to the frame member 21.

Extending forwardly, rearwardly and upwardly from the top of the casing 19, are arms 25 and 26, which are bolted to the gang frame. As shown the pivot shafts 22, for the front gangs, are journaled at the rear and centrally of the respective gangs, while the pivot shafts 22, for the rear gangs are journaled correspondingly, but on the front side of each gang, as clearly shown in Figs. 1 and 2. Upon the upper end of each of the shafts 22, is rigidly secured a bevel pinion 27. Journaled centrally of the frame and transversely thereof is the main driving shaft 28, provided with cranks 29, on which are engaged the connecting rods 30, of the motor, which is shown as an explosive engine or hydro-carbon motor having four cylinders, two of which are arranged on each side of the shaft, and which may be coupled with the cranks in pairs, as shown in Fig. 1, or in any other suitable manner. Rigidly secured on said shaft 28, between each center sill and the adjacent side sill, are inwardly facing friction disks 31 and 32, and extending upwardly above each sill is a bracket or arm 33, and supported on the tops thereof, and extending for the entire width of the machine is a guide bar 34. Slidably supported on the shaft 28, between the disks 31 and 32, is a bracket 35, which, at its upper end, slidably engages said guide bar 34. Extending longitudinally of the machine from each of said brackets or arms 35, are bosses or hubs 36, as clearly shown in Fig. 4, in which are rotatably engaged the ends of shafts 37 and 38, whereby the front and the rear gangs are driven. The outer ends of said shafts 37 and 38, are journaled in suitable ball, pivotal or other bearing boxes to permit slight oscillation adjacent the bevel gear 27, and are each provided with a bevel gear 39, which mesh with the bevel gear 27. Feathered upon the inner end of each of said shafts 37 and 38, is a driven friction member denoted respectively by the reference numerals 40 and 41. A shifting arm 42, rotatably engages the hub of each of said friction disks 40 and 41, and extends downwardly beneath the same and horizontally inward, and are provided with rack teeth 43 and 44, respectively, at all times in mesh with a pinion 45. For the purpose of rotating said pinion 45, to adjust said disks 40 and 41, inwardly or outwardly to vary the speed of rotation thereof, a chain 46, is trained about a sprocket wheel rigid on said shaft on which said pinion 45, is connected, though not shown, and of its other end trained about a sprocket wheel 47, on a transverse shaft 48. A small countershaft 48$^a$, is journaled above said shaft 48, and has secured thereon a sprocket wheel 48^b, which is connected to drive said sprocket wheel 47, by means of a suitable chain. Also rigidly secured upon said shaft 48^a, is a sprocket wheel 49, which has trained thereabout a chain 50, which is also trained about a sprocket wheel 51. An operator's seat 52, is provided at the rear of the machine, and mounted in front of the same upon an inclined tubular shaft 53, is a hand wheel 54, and extending within said tubular shaft 53, is another shaft 55, on which a hand wheel 56, is secured. Each of said shafts 53 and 55, extend into a housing 57, mounted on the frame, wherein gearing connections are provided which serve to drive tubular shafts 58 and 59, which extend from said housing transversely the machine on each side of said housing, at their ends having secured thereon the respective sprockets 51, already described. Thus it is apparent that by rotation of the hand wheels 54 and 56, due to the various driving connections effected through the sprocket chain and shafts, said pinion 45, is caused to rotate to adjust the friction driven disks 40 and 41, respectively, on each side of the machine. Means are also provided for shifting the respective pair of driven friction disks 40 and 41, bodily into driving engagement simultaneously with either of the corresponding driving friction disks 31 or 32. For this purpose a bell crank lever 60, is pivotally engaged upon the guide bar 34, and engages at one end the slide arm 35. The other end is engaged by a rod 61, which leads rearwardly and is engaged on a suitable lever 62, provided with a notched segment as shown in Fig. 2, and whereby the operator, by shifting this lever in one direction, throws both friction disks of the shaft into engagement with the disk 31, and by shifting in the opposite direction throws both friction disks into engagement with the friction disk 32, thus enabling the machine to be driven ahead or reversed as desired.

Mechanism is provided for varying the angular adjustment of each gang with reference to the machine as a whole, or to the remaining gangs. For this purpose a stud shaft is journaled in a suitable bearing 63, below each side frame member, and rigidly secured thereon is a roller or friction wheel 64. Pivoted on said shaft is a segment shaped lever 65, provided at its lower extremity with an anti-friction roller 66, in turn bearing against the friction roller 64, and on the outer end of the shaft is provided a worm 67, which meshes with a worm gear 68, journaled in a depending bracket 69, integral with the bearing 63. Also rotatably engaged upon said segment shaped lever 65, and bearing against the friction wheel 64, is an idler 70, which is in positive bearing also against a driving friction wheel 71, near the upper end of said lever. Said segment shaped lever is so shaped and positioned relatively to one of the main driving friction disks 32, that when thrown in one direction the lower friction wheel 66, is brought into engagement with the driving friction wheel, thus rotating the friction wheel 64, and worm, while shifting the lever 65, in the opposite direction brings the friction wheel 71, into engagement with the driving friction wheel 32, thus transmitting the drive through the idler 70, to the driven friction wheel 64, for the worm. Said rollers or driven friction members are so arranged on the lever 65, that the wheels 64 and 70, can never contact the driving friction member, and where four gangs of disks are employed, each of said friction disks 32, is provided with a construction such as described on each side of the machine. Threaded through each of said worm gears 68, are shafts 72, provided each at its outer end with an eye to which is shackled a connecting rod 73, which engages a suitable link or eye on the end of the corresponding gang frame, as shown clearly in Figs. 1 and 2. Means are provided for actuating said segment levers to throw either end of either or both of said levers at one side of the machine into engagement at the same time. For this purpose rods 74, extend rearwardly from each of the levers on each side of the machine, and, as shown, are connected with suitable arms 75 and 76, on shafts, one of which is rigidly connected to the lever arm 75, and extends through a tubular shaft 77, which is rigidly connected to the arm 76. Near the operator's seat each of said shafts is connected with a lever denoted respectively by the reference numerals 78 and 79, and any suitable segment means is provided for holding the lever in any adjusted position. On each outer end of the main shaft 28, is rigidly secured a driving friction disk 80, substantially the same size as the transmission disks 31 and 32. Also secured on said shaft is a sleeve 81, provided with a lateral apertured boss in which is rotatably engaged a shaft 82, as shown in Figs. 1 and 2, the rear end of which is supported in a bracket bearing 83, rigidly bolted on the side sill. Beyond said shaft is connected a shaft 84, by means affording a universal joint 85. Said shaft 84, extends into a tubular sleeve or shaft 86, as shown clearly in Figs. 1 and 2, whereby said shaft section is adapted for variation in length, dependent upon the adjustment of the gangs. Supported upon each rear gang frame and, as shown, below the main frame, is the automatic seed dropping means, one on each side the rear gang frame, and may be of any desired type and regulating the drop of seed of whatsoever kind, and, as shown, the interior mechanism of the dropper or seeder is operated from the sleeve or tubular shaft 86, the rear end of which is provided with a universal joint 87, and with a bevel gear 88, which meshes with a bevel gear 89, whereby the mechanism of the seeder is operated. The seeders are thrown into operation by engagement of the driving disk 80, and driven transmission friction disk 90, feathered on said shaft 82. For the purpose of adjusting said driven disk 90, into and out of engagement with the driving friction disk 80, the edge of the driving friction disk 80, is beveled to afford a free entrance of the driven disk 90, thereon, and a rod 91, is yoked at its end to engage the hub of said friction disk 90, and extends rearwardly and is connected with a lever 92. Said lever 92, is secured on a shaft 93, on which is also secured an actuating lever 94, whereby the parts may be moved into adjusted position independent of any movement or shifting of the gang frames, and whereby the dropping action may be continued without interruption during the operation of the machine. Of course, where two seeders are shown, as in the construction illustrated, the friction transmission to the seeders is substantially identical on both sides of the machine. Beneath each of the seeder or planting mechanisms at the rear of the disks of the rear gangs are provided spouts 95, which, at their lower ends have an enlarged extension 96, adapted to be adjusted upwardly or downwardly, dependent upon the depth which it is desired to plant the seed. For the purpose of adjusting the same a rod 97, is pivotally engaged on the lower end or extension of each spout and is connected with an arm 98, secured on a shaft 99, extending transversely of the machine as clearly shown in Fig. 3, and as shown a lever 100, is provided on the machine adjacent the operator whereby said spouts may be adjusted to the required depth at which it is desired to deposit the seed.

Covering means are provided at the extreme rear end of the machine. For this purpose, a shaft 101, extends transversely the machine and is supported upon suitable brackets 102, and is provided with an arm 103, which extends upwardly and rearwardly and is connected in any suitable manner, as for instance with the bar 104, with an operating lever 105, on the machine. Rigidly secured on the shaft are depending spring fingers or plates 106, which serve to stir the soil and to cover the dropped seed.

The operation is as follows: Should the ground be covered with a crop that it is desired to gather, as for instance wheat or other cereal or grass, or even with weeds or other refuse the cutting mechanism is employed and supported upon the frame as illustrated in Figs. 1 and 2. The propelling and supporting means for the main frame, namely the gangs of disks are in the present construction shown as four in number, although a machine with a single gang of disks front and rear operates admirably. Said gangs may, by means of the shifting mechanism before described be arranged in any desired angular relation with one another or with the main frame. This is particularly important inasmuch as the angular relation of the axes of the gangs to the main frame or the line of travel determines the cut of the disks, said disks having very slight cutting effect when arranged with the axes at right angles with the line of travel, as shown in Fig. 1, and the cutting effect increases, as well as the ability of the disks to turn a furrow when said disks are arranged with their axes obliquely directed with reference to the line of travel. Any suitable means may be provided, of course, for accomplishing this adjustment. Owing, however, to the stress exerted upon the disks in plowing or preparing the soil, a shifting mechanism of considerable power is required and for this purpose the worm and worm gear are employed and are actuatd in either direction by shifting the segment shaped levers in the proper direction. The adjustment of the gangs is of course facilitated for the reason that each gang frame is engaged with the main frame by means of the shaft 22, as shown in Fig. 4, to permit said gang frames to swing freely in adjusting, and, as shown, the simple and exceedingly effective worm gear secured between the central pair of disks and positively engaging or meshing with the worm on the lower end of the shaft 22, enables the gangs to be turned with a minimum of frictional resistance aside from that encountered from the soil.

By utilizing the shaft 22, as the pivot shaft for the gang frames, it is not necessary to provide a coupling of any kind in the driving shaft. It is only necessary to provide means for varying the rate of drive by shifting the driven friction disks 40 and 41, toward the center for slow speed and toward the periphery of the driving disks for a higher speed. This is accomplished by the mechanism before described and positively actuated by means of the hand wheels whereby the driven friction wheels for each transmission are adjusted independently of the driven friction wheels for the other transmissions.

The seed dropping mechanisms may, of course, be of any desired kind and may be for any kind or sort of seed. Preferably, one of such seed dropping mechanisms is carried upon each rear gang frame and the mechanism thereof actuated by the telescoping shafts, which are driven from the supplemental driving transmission disk 80, before described. When the friction wheels 90, are in engagement with said driving disk 80, the telescoping shafts are rotated, in turn driving the gears or other elements whereby the dropping mechanism is operated. Should it at any time be desired to stop the action of the dropping or seeding mechanism, this may be accomplished by means of the levers 94, whereby said driven friction wheels 90, are retracted from the driving friction disk 80.

The dropping pipes or spouts which are made in two sections, the lower or large one being adapted to telescope over the upper smaller one, which extends thereinto, said lower section being connected by means of a rod with the bell crank, are operated in any suitable manner to lift the lower section of the boot to any desired height.

All the mechanisms described are operated from a single source of power, supported upon the main frame, a gas engine of suitable size being employed for this purpose, and the machine is operated under its own power, all the mechanisms being operated simultaneously first to strip refuse or other material from the soil, after which the supporting wheels for the machine, namely, the gangs of disks, serve to cut the sod and open the soil in advance of the seed dropping means. The seed is dropped at the rear of each rear disk of each gang to the desired depth, owing to said adjustment of the dropping pipe and is immediately covered by the resilient covering mechanism or fingers, which not only assist in pulverizing the soil, but assist in placing the soil evenly over the planted area. All said elements coöperate to the one single, central purpose of enabling the agriculturalist to satisfactorily prepare the land and plant a very large acreage in the most uniform and the most acceptable manner in the briefest space of time.

It is to be observed that the gangs of disks serve as the supporting wheels of the machine, and serve not only to move the machine forward in plowing, but also serve the purpose of plows to effectively and perfectly turn the soil, this operation being facilitated by the peculiar angularity of the disks themselves.

In turning the machine, the angularity of one set of gangs relative the remaining pairs assists materially. This may also be augmented by increasing the rate of drive for the particular gangs on the outer side of the circle or arc formed in turning, or, if desired, the gangs on one side of the machine may be slightly reversed, and the gangs on the other side driven ahead with the result of turning in a very small area.

Of course, I am well aware that many of the details of construction and the particular connections and actuating means for the various devices and mechanisms embraced in my invention may be modified through a very wide range. For instance, instead of friction transmission devices, geared or any other suitable transmission devices may be employed without departing from the principles of my invention, and obviously it is quite immaterial how many gangs of disks be employed in opening the soil, so long as the machine is partly supported upon, and wholly or partly propelled by the disks. I therefore do not purpose limiting the patent granted otherwise than necessitated by the prior art.

I claim as my invention:

1. An automobile seeding machine embracing a frame, gangs of supporting and propelling plowing disks on which the frame is carried, each gang independently adjustable, seeders secured to the rear of the rear gangs of plowing disks, covering means behind the seeders, a motor on the frame, friction driving mechanism operated by the motor and connected to operate the gangs of plowing disks, friction members driven from the motor, extensible drive shafts connected to drive the seeders and a friction member on each extensible shaft adapted to contact one of the aforesaid friction members.

2. In a machine of the class described rotative traction disks acting as plows, means adjusting the same in a horizontal plane, a motor for driving the same, a seeder adjustable with the disks and operatively connected with the motor and dropping seeds behind the plows, friction transmission devices, and extensible shafts affording part of the connection between the friction transmission devices and the seeder.

3. In a planting machine a frame, front and rear gangs of traction and plowing disks supporting and propelling the same and adjustable as a whole by rotation in a horizontal plane beneath the frame, a seed dropping mechanism carried on and adjustable with one of the disk gangs, seed covering means carried at the rear of the seed dropper, a motor and driving connections between the same and the gangs and the dropping mechanism, and extensible sections in the drive for the dropping mechanism, whereby the dropping mechanism is made automatically adjustable with the adjustment of the gangs and without stopping the operation of the machine.

4. In a machine of the class described a frame, a motor on the frame, sets of plows actuated by the motor, seeding mechanism, telescoping shafts connected to actuate the same, coacting friction members driven by the motor, and universal connections between the same and the telescoping shafts.

5. In a machine of the class described a frame, a motor mounted thereon, a main driving shaft actuated by said motor, plows movably mounted on said frame, seeding mechanism, said plows and said mechanism connected with said main shaft and simultaneously actuatable by said motor.

6. In a machine of the class described a frame, a motor thereon, sets of adjustable plows on said frame actuatable by said motor, seeding mechanism adjustable with said plows and operatably connected with the motor for dropping seed behind said plows, and friction means supported on the frame for adjusting said seeding mechanism without stopping the operation of said motor.

7. In a machine of the class described a frame, plows adjustably connected therewith for supporting and propelling the same, seeding mechanism carried by and adjustable with two of said plows, a motor on said frame frictionally connected to drive said plows and mechanism, and seed covering means mounted on said frame.

In testimony whereof I have hereunto subscribed my name in the presence of two subscribing witnesses.

ALBERT E. COOK.

Witnesses:
CHARLES W. HILLS, Jr.,
FRANK K. HUDSON.

Copies of this patent may be obtained for five cents each, by addressing the "Commissioner of Patents, Washington, D. C."